Sept. 9, 1952  A. A. BRAINERD  2,610,289
ENCLOSED INTERNALLY HEATED ELECTRIC DISCHARGE LAMP
LUMINAIRE FOR VARIABLE TEMPERATURE SERVICE
Filed Feb. 23, 1949  3 Sheets-Sheet 3

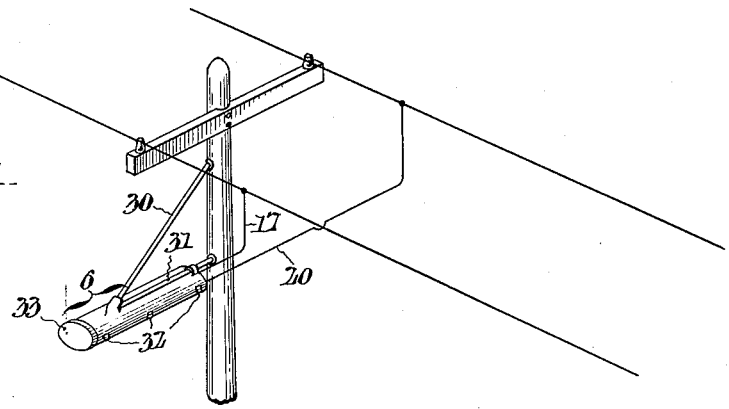
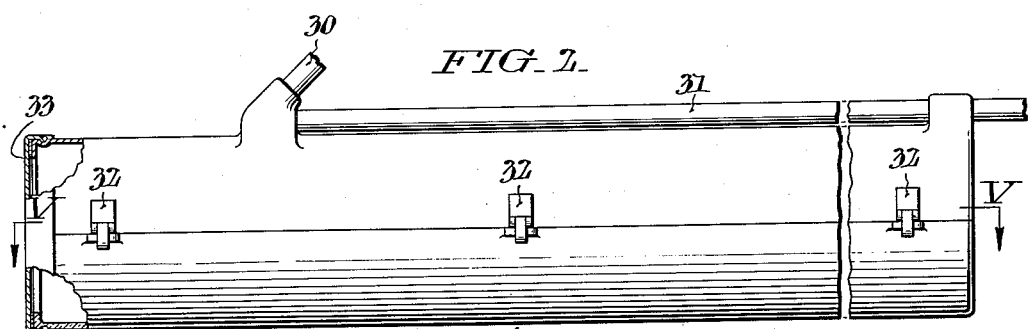
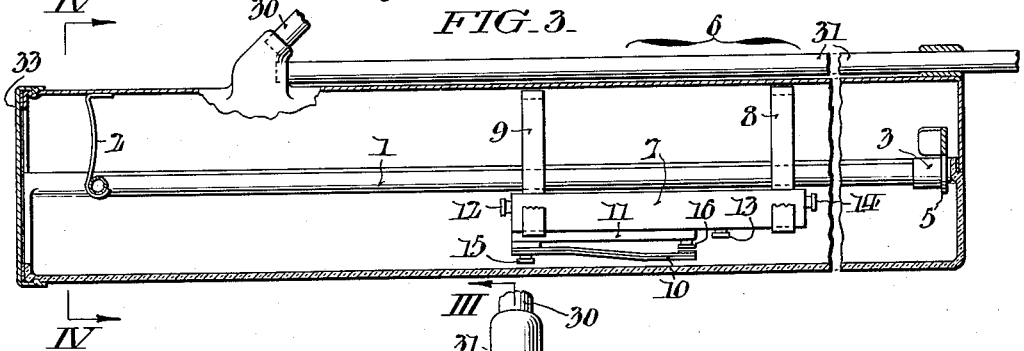
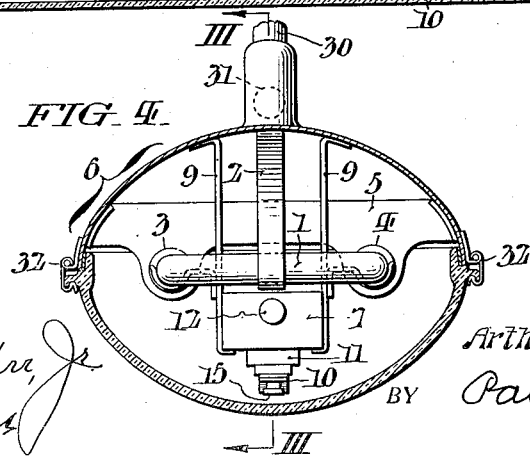

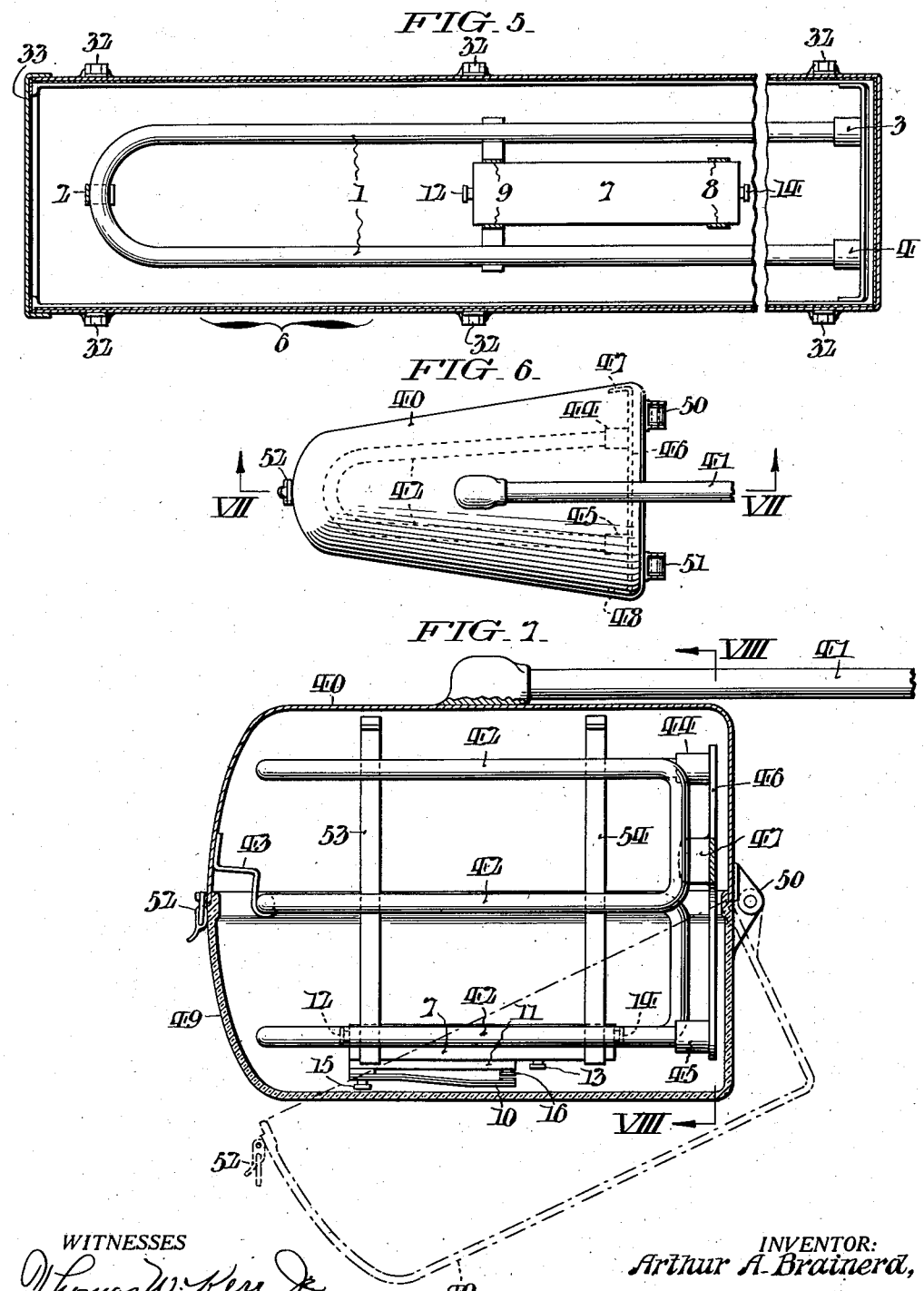

WITNESSES

INVENTOR:
Arthur A. Brainerd,
BY
ATTORNEYS.

Patented Sept. 9, 1952

2,610,289

UNITED STATES PATENT OFFICE 2,610,289

ENCLOSED INTERNALLY HEATED ELECTRIC DISCHARGE LAMP LUMINAIRE FOR VARIABLE TEMPERATURE SERVICE

Arthur A. Brainerd, Norwood, Pa.

Application February 23, 1949, Serial No. 77,956

5 Claims. (Cl. 240—11.4)

This invention relates to luminaires, and more particularly to gaseous discharge outdoor lighting luminaires embodying means for maintaining efficient operation through a wide outdoor ambient temperature range.

In the lighting art it is well known that the efficiency of gaseous discharge lamps is considerably higher under optimum temperature conditions than the efficiency of incandescent lamps of the same wattage. Gaseous discharge lamps have therefore gone into extensive use in factories, office buildings and the like. For indoor lighting where the temperature of the air surrounding the lamp is normally of the order of 70° F. the light efficiency of such lamps has been very satisfactory and their average life has been very high. However, their use for street lighting and other outdoor lighting applications has been limited by the fact that there is a substantial decrease in the light efficiency of such lamps at temperatures below about 60° F. Consequently such lamps have not gone into wide use for outdoor lighting since it has not been possible to provide an efficient unit which is capable of furnishing a light output reasonably constant over the normal variations in outdoor temperatures. The present invention is directed toward providing an outdoor lighting unit which utilizes a gaseous discharge tube and which efficiently provides a substantially constant light output throughout a range of widely varying ambient temperatures.

A further difficulty heretofore involved in the use of gaseous discharge lamps for street lighting and the like arises out of the fact that the high voltage lines in general use for street lighting operate at 2300 volts or 4000 volts whereas the street lighting lamps commonly used operate at a much lower voltage. This has required the use of constant current transformers or other special transformer equipment in order to reduce such high voltages to the lower voltages required for the low voltage lighting units heretofore employed. The use of such transformers adds materially to the expense and creates installation problems since it is customary to mount such transformers independently of the lighting unit. Therefore, one object of the present invention is to provide an efficient gaseous discharge luminaire for outdoor use utilizing voltages of the order of 2300 volts to 4000 volts at the luminaire terminals.

It is a further object of my invention to provide a low-cost gaseous discharge outdoor lighting luminaire suitable for street lighting and the like.

A further object of my invention is to provide a gaseous discharge lamp luminaire having efficient lighting characteristics over a wide ambient temperature range.

A further object is to provide a gaseous discharge tube luminaire of the above described characteristics which may be efficiently operated over a wide ambient temperature range when connected directly across a high voltage source and which will provide adequate light for time periods of the order of one year without lamp replacement.

A still further object of the present invention is to provide an enclosed luminaire for outdoor use having means within said luminaire for creating and maintaining an inside air temperature at the lamp location sufficiently high to insure efficient and stable operation of a gaseous discharge tube over a wide range of outdoor temperatures.

The broad objectives of the present invention are achieved by providing within the lamp enclosure a current limiting and heat producing reactor in circuit with the lamp and continuously operative during the period of operation of the lamp.

Other objectives are achieved in the device of the present invention by automatically combining the action of a plurality of factors all of which are varied in response to changes in the outside ambient temperature. In order to employ high voltages at the luminaire terminals, I provide a suitable reactor which is connected in circuit with the gaseous discharge tube and the line and which is mounted inside the luminaire enclosure below and in heat exchange relationship with the air surrounding the gaseous discharge tube so that the reactor adds heat to the lamp area of the enclosure when the lamp is operating. At the same time the luminaire and the reactor are so constructed and arranged as to provide an air space which undergoes changes in temperature responsive to changes in the outside ambient temperature but is not affected by the added heat derived from the reactor. I have also provided means for automatically increasing the heat output from the reactor and at the same time increasing the current to the lighting tube when the outdoor ambient temperature falls below a predetermined minimum.

The foregoing and other objects are attained by my inventive device disclosed herein and illustrated in the appended drawings, in which:

Fig. 1 is a representation of the external appearance of the luminaire of the present invention mounted on the usual pole.

Fig. 2 is a side view of the luminaire of Fig. 1 partly in section to show details of the cap member.

Fig. 3 is a vertical section through the luminaire of Fig. 2 taken along the lines III—III of Fig. 4.

Fig. 4 is a transverse vertical section through the luminaire of Fig. 3 taken along the lines IV—IV of Fig. 3.

Fig. 5 is a horizontal section taken as indicated by the arrows V—V of Fig. 2.

Fig. 6 is a plan view of an alternate form of the invention.

Fig. 7 is a vertical section taken along the lines VII—VII of Fig. 6.

Figure 8:
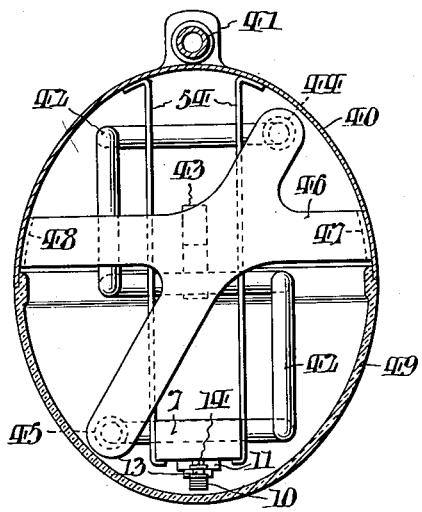
Fig. 8 is a vertical section taken along the lines VIII—VIII of Fig. 7.

According to my invention, a gaseous discharge lighting tube 1 is mounted in an enclosure 6, as shown in Fig. 5, together with certain auxiliary electrical equipment hereinafter described including a reactor 7 which is so constructed as to make it possible to operate the tube 1 directly from a high voltage source. The heat resulting from the power loss of the reactor 7 is added to the air surrounding the tube 1. The reactor 7 is so constructed and arranged that its heat output is automatically increased through the action of thermostatic switch 10 when the temperature falls below a predetermined value. At the same time an increased current is applied to the tube 1.

In Fig. 1 the enclosure 6, having an end cap member 33, is shown attached to a standard pole by means of mounting arms 30 and 31. High voltage leads 17 and 20 are shown connected directly to the luminaire terminals. Clamps 32 are provided for attaching a transparent and non-heatconducting section which forms the bottom half of enclosure 6. Details relating to the mounting elements 30 and 31, the clamps 32 and the end cap 33 are shown in Figs. 2 and 4.

Referring now to Figs. 3, 4 and 5, a U-shaped gaseous discharge tube 1 is supported at its closed end by the bracket 2. The extremities at the open end of tube 1 are supported in sockets 3 and 4 which are held in place by means of a bracket 5. Reactor 7 consisting of a coil of insulated wire wound around a laminated iron core is supported by hangers 8 and 9 which are attached to the upper half of housing 6 as shown in Fig. 4. Thermostatic switch 10 is mounted beneath the casing of reactor 7 and is thermally insulated from reactor 7 by the insulating strip 11. Switch 10 is responsive to changes in the outside air temperature since the air within the lower portion of the enclosure below the reactor 7 is substantially at the temperature of the outside air. A bimetallic strip-type switch 10 comprising a pair of strips of metals having different coefficients of thermal expansion is shown, but it will be apparent that many of the commercially available thermostatic switches will be applicable in my inventive luminaire. The reactor 7 is provided with electrical contacts 12, 13 and 14 and switch 10 is provided with electrical contacts 15 and 16 in order to facilitate the completion of electrical connections in accordance with the diagram shown in Fig. 9.

Figure 9:
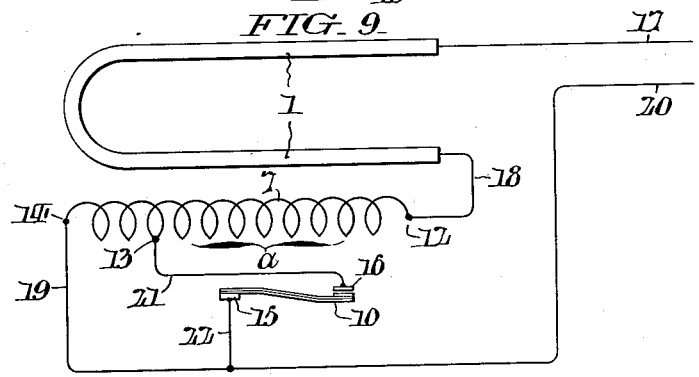
Fig. 9 is a circuit diagram of the electrical components of one embodiment of the present invention.

In the operation of the circuit of Fig. 9 at relatively high outside air temperatures, switch 10 is open and the current flows through conductor 17, tube 1, conductor 18, reactor 7 and conductors 19 and 20, the entire body of the reactor 7 being utilized. When the temperature at the location of thermostatic switch 10 drops below a preselected value the switch 10 closes and the current flows through conductor 17, tube 1, conductor 18, the portion "a" of reactor 7, conductor 21, switch 10, and conductors 22 and 20. The closing of switch 10 increases the loss in reactor 7 and this results in an increased supply of heat to the air above reactor 7 and particularly the air surrounding tube 1. At the same time the current input to tube 1 is increased and this increases the light output and also the heat generated by tube 1. Since reactor 7 is mounted under tube 1 and is insulated from below, the increased heat output raises the temperature of the air surrounding the tube 1 to the desired operating temperature, without, however, raising the temperature of the air surrounding the switch 10.

Figure 10:
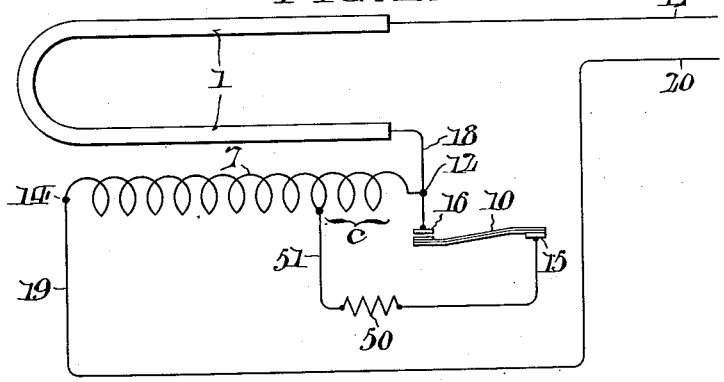
Fig. 10 is a circuit diagram showing the electrical components of an alternate form of the present invention.

In the operation of the alternate form of the present invention as illustrated in the diagram of Fig. 10, the closing of switch 10 results in connecting resistance 50 across the portion "c" of reactor 7. This provides an overall increased power loss and hence an increase in the heat supplied to the air surrounding tube 1 from the combination of reactor 7 and resistance 50.

In Figs. 6, 7 and 8 an alternate form of my invention is shown in which enclosure 40 is supported by a single arm 41. Lighting tube 42 is mounted within enclosure 40 and is constructed and arranged to form a series of three U-shaped lighting elements disposed one above the other. Tube 42 is held in place by bracket 43 and by sockets 44 and 45. Bracket 46 to which sockets 44 and 45 are attached is supported on the inner wall of enclosure 40 by means of lugs 47 and 48 which are welded or otherwise integrated with the enclosure wall. The lower half of enclosure 40 consists of a transparent and non-heatconducting cover 49 which is mounted on hinge elements 50 and 51 and is held in operating position by the hasp 52. For inspecting and servicing the cover 49 can be lowered to the position shown in dotted lines in Fig. 7. Reactor 7 is held in position underneath the lower-most level of tube 42 by straps 53 and 54 which are attached to the enclosure 40 as shown in Fig. 8. Thermostatic switch 10 is mounted beneath the casing of reactor 7 and is thermally insulated from reactor 7 by the insulating strip 11. Electrical contacts 12, 13, 14, 15 and 16 are provided to facilitate the completion of electrical connections in accordance with the diagram of Fig. 9.

As shown in Fig. 1, the luminaire of my invention may be connected directly across a high voltage line at voltages as high as 2300 or 4000 volts or above. The electrical connections within the enclosure will be apparent from the diagrams of Figs. 9 and 10 and it will be apparent that the leads to lines 17 and 20 can be brought out through the wall of the enclosure in ways well known in the art.

Structurally, my invention is adapted to various designs. The lower surface of the enclosure 6 is made of a transparent or translucent material such as glass, plastic or the like. The transparent housing member is shaped to fit snugly with the upper half of enclosure 6 and this operates to minimize heat losses at this level and since the material of enclosure 6 is a non-conductor of heat the air in the lowermost portion remains substantially at the temperature of the outside air. For application in unusually cold climates the upper housing may be insulated. The entire housing unit of Fig. 1 is preferably open at one end and provided with a snug-fitting cap 33 which is slidably removable for rapid replacement of inoperative parts. A slight displacement of the lighting tube toward the open end of the luminaire disconnects the tube from its sockets and opens the circuit thus eliminating any danger that the lineman might contact live terminals in the auxiliary.

The construction and operation of my luminaire is illustrated in the following specific examples in which values have been assigned to the various electrical components.

*Example 1*

A street lighting luminaire was designed following the embodiment shown in Figs. 2-5 for operation at 2300 volts. The discharge tube was 8 feet long and one inch in diameter and was equivalent to a resistance of 2000 ohms. A reactor 7 having an impedance of 12,000 ohms at 3.7% power factor was positioned as shown in Fig. 3 and wired according to Fig. 9, conductor 21 being connected to reactor 7 in such position that the portion "a" of reactor 7 included 90% of reactor 7. At an applied line voltage of 2300 volts across terminals 17 and 20 and with switch 10 in an open position there will be a current flow of 190 milliamperes. Under these conditions there will be a power loss of 70 watts in the lamp and 16 watts in the reactor or a total of 86 watts. With switch 10 closed the current increases to 210 milliamperes which increases the power in the lamp to 85 watts and in the reactor to 18 watts or a total of 103 watts with attendant increase in temperature of the air surrounding the discharge tube.

*Example 2*

The lamp described in Example 1 was designed following the wiring diagram of Fig. 10 for operation at a voltage of 2300 volts across the terminals. Reactor 7 was of the same type as in Example 1 but had an overall impedance of 11,500 ohms. Resistance 50 had a value of 600 ohms. With the bimetallic switch 10 in its open position the current flow was 200 milliamperes and the power losses were 79 watts in the lamp and 17 watts in the reactor, or a total of 96 watts. After closure of switch 10 the current increases to 210 milliamperes and the losses amount to about 87 watts in the lamp, 17 watts in the reactor and 20 watts combined loss in the resistor and 10% of the reactor. The total power loss was therefore 124 watts or an increased power loss of 28 watts on closing of switch 10 with a corresponding heat loss available for heating the air surrounding the lamp.

While I have described the present invention in terms of a reactor having certain specified characteristics, it should be noted that changes in the construction of such reactor may be made if it is desired to provide more added heat or less added heat. For instance, changes in the windings or in the core of such reactor will result in changes in the heat losses and these changes may be made taking into account the anticipated variations in outside ambient temperature. It is also possible to provide a reactor which is adjustable to give a suitable current loss and at the same time provide a quantity of added heat properly correlated with anticipated variations in outside ambient temperatures.

While the drawings in the present application include a thermostatic switch 10 for changing the amount of heat loss in reactor 7, it will be understood that for many conditions of operation improved results in lamp operating efficiency will be obtained through the practice of the present invention even where such switch is omitted. For instance, in the latitude of Philadelphia I have found that the loss in efficiency caused by heating the air surrounding the lamp to a temperature in excess of the optimum is more than offset by the gain in efficiency resulting from the addition of heat during periods when the outside air temperature is below the optimum with respect to lamp efficiency and therefore a net gain in efficiency is obtained even where the heat loss at the reactor remains constant.

Having thus described my invention, I claim:

1. In an outdoor street lighting luminaire, having an enclosure, a gaseous discharge lamp mounted in said enclosure, a current limiting reactor also in said enclosure, said reactor having substantial heat loss on energization, said lamp being wholly above said reactor, with substantially uninterrupted free space therebetween, an electric circuit connecting the reactor and discharge lamp together and energizing the reactor to furnish heat continuously to the luminaire by upward air convection within the enclosure throughout the entire period of operation of the lamp, and a thermostatic switch mounted below and thermally insulated from said reactor, said switch being disposed near the bottom of the enclosure for response to fluctuations in ambient temperature, and also being connected in circuit with said reactor and effective to remove from the circuit a portion of the reactance element, thereby increasing the heat loss of the reactor, and of the discharge lamp itself, in response to decrease of ambient temperature below a predetermined value.

2. An electric discharge lamp luminaire comprising an enclosure, an electric discharge lamp mounted in said enclosure, a reactor coil mounted in said enclosure wholly below the horizontal plane tangential to the bottom of said lamp, with substantially unobstructed free space therebetween, a thermostatic switch mounted adjacent the bottom of said enclosure for response to changes of temperature outside the enclosure, thermal insulating means intermediate said reactor coil and said thermostatic switch, a source of electricity, a lamp-operating circuit including electric conductors connecting said source, directly to the reactor coil and directly to the discharge lamp, and connecting the reactor coil in series with the discharge lamp, and by-pass conductors connecting said thermostatic switch into said lamp-operating circuit through a portion only of said reactor.

3. An electric discharge lamp luminaire comprising an elongate shell closed at one end and open at the other end, electric sockets spaced apart within the shell adjacent said closed end, an electric discharge lamp in the form of an elongate U-tube having free ends spaced according to the spacing of said sockets and adapted to be inserted therein, said U-tube extending lengthwise of said elongate shell with its closed end accessible at the open end of said elongate shell remote from said sockets, an electrically energized heating element in said enclosure connected in circuit with said U-tube, a thermostatic switch mounted adjacent the bottom of said elongate shell for response to changes of temperature outside of the shell, said thermostatic switch being connected in circuit with said heating element to control the heat loss thereof, and a removable cap element shaped to fit the open end of said elongate shell to form an air-tight enclosure, said removable cap normally confining heat within said shell, and said U-tube being readily removable through the open end of said shell by removing said cap and gripping the closed end of the U-tube.

4. An electric discharge lamp luminaire comprising an elongate shell closed at one end and open at the other end, electric sockets spaced apart within the shell adjacent said closed end, an electric discharge lamp in the form of an elongate U-tube having a pair of legs having free ends spaced according to the spacing of said sockets and adapted to be inserted therein, said U-tube extending lengthwise of said elongate shell with its closed end accessible at the open end of said elongate shell remote from said sockets, and said legs being at substantially the same level, an electrically energized heating element in said enclosure connected in circuit with said U-tube, said heating element being between and wholly below the horizontal plane tangential to the bottom of said legs with substantially unobstructed free space between the heating element and each of said legs, and a removable cap element shaped to fit the open end of said elongate shell to form an air-tight enclosure, said removable cap normally confining heat within said shell, and said U-tube being readily removable through the open end of said shell by removing said cap and gripping the closed end of the U-tube.

5. The invention set forth in claim 1 further characterized by the fact that the lower portion of the luminaire enclosure is constructed of light transmitting material having low thermal conductivity.

ARTHUR A. BRAINERD.

REFERENCES CITED

The following references are of record in the file of this patent:

UNITED STATES PATENTS

| Number | Name | Date |
|---|---|---|
| 1,988,555 | Harse | Jan. 22, 1935 |
| 2,101,135 | Finch et al. | Dec. 7, 1937 |
| 2,167,472 | Bedford | July 25, 1939 |
| 2,194,300 | Found | Mar. 19, 1940 |
| 2,203,550 | Spanner | June 4, 1940 |
| 2,293,116 | Claspy | Aug. 18, 1942 |
| 2,302,667 | Duncan | Nov. 24, 1942 |
| 2,373,402 | Lecorguillier | Apr. 10, 1945 |
| 2,456,870 | Francis et al. | Dec. 21, 1948 |

FOREIGN PATENTS

| Number | Country | Date |
|---|---|---|
| 392,796 | Great Britain | May 25, 1933 |